United States Patent

[11] 3,620,546

[72] Inventor John H. Andersen
654 Broadway, Bethpage, N.Y.
[21] Appl. No. 858,466
[22] Filed Sept. 16, 1969
[45] Patented Nov. 16, 1971

[54] GOLF CART WITH CLUB RACK FOLDABLE BY CART HANDLE
9 Claims, 6 Drawing Figs.

[52] U.S. Cl. .................................................. 280/40,
150/1.5 B, 280/42, 280/DIG. 6
[51] Int. Cl. ....................................................... B62d 3/00
[50] Field of Search ............................................ 280/36, 42,
DIG. 6, 47.19; 150/1.5

[56] References Cited
UNITED STATES PATENTS

| | | | |
|---|---|---|---|
| 2,590,154 | 3/1952 | Burns .......................... | 280/DIG. 6 |
| 2,681,810 | 6/1954 | Lowinski ..................... | 280/DIG. 6 |
| 2,857,168 | 10/1958 | Neaverson et al. ........... | 280/36 |
| 2,911,228 | 11/1959 | Green .......................... | 280/36 |
| 2,914,336 | 11/1959 | Hibben, Jr. et al. ........... | 280/42 |
| 2,957,707 | 10/1960 | Zagwyn ....................... | 280/124 |

*Primary Examiner*—Leo Friaglia
*Assistant Examiner*—Winston H. Douglas
*Attorney*—Mattern, Ware & Davis ABSTRACT: In a conventional wheeled cart for closed by transporting golf clubs there is substituted for the usual club-carrying bag a dual rack of the folding type wherein at least one of two slablike rack sections is inclinable relatively to the other section between open and closed conditions of the rack. The opening and closing of the rack is performed by swinging movement of a handle by which the cart is hauled. In a cart wherein the ground wheels of the cart are shifted between spread and retracted positions such shifting of the wheels positions is caused by swinging of the same handle that hauls the cart wherefor opening and/or closing of the rack takes place simultaneously with the spreading and retracting of the ground wheels of the cart.

PATENTED NOV 16 1971 3,620,546
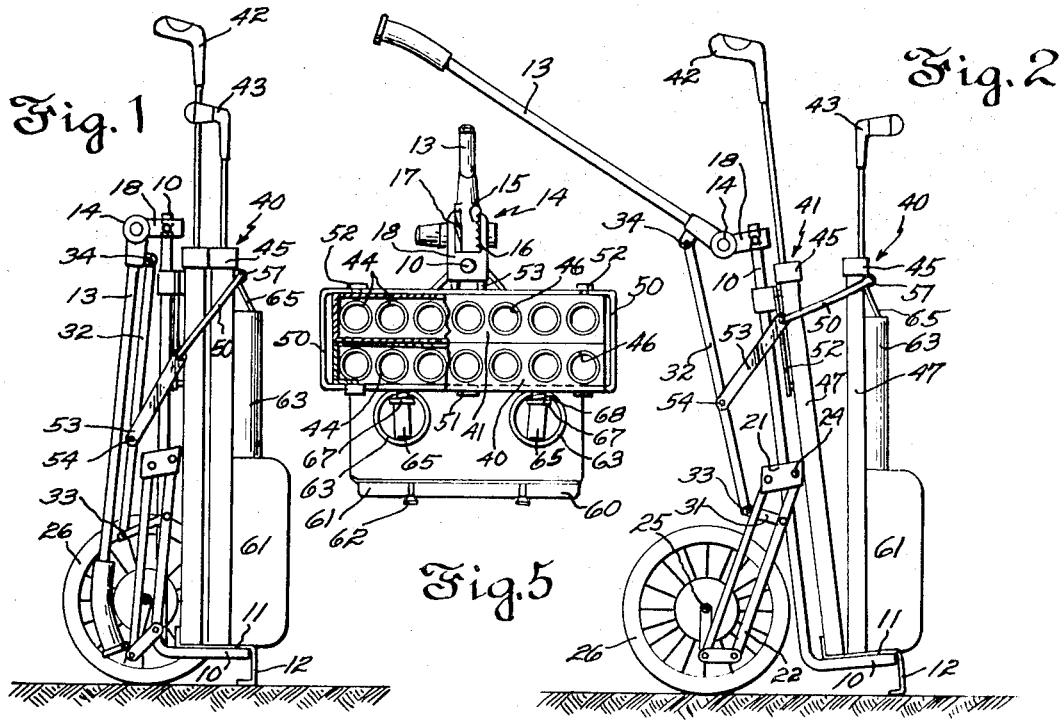
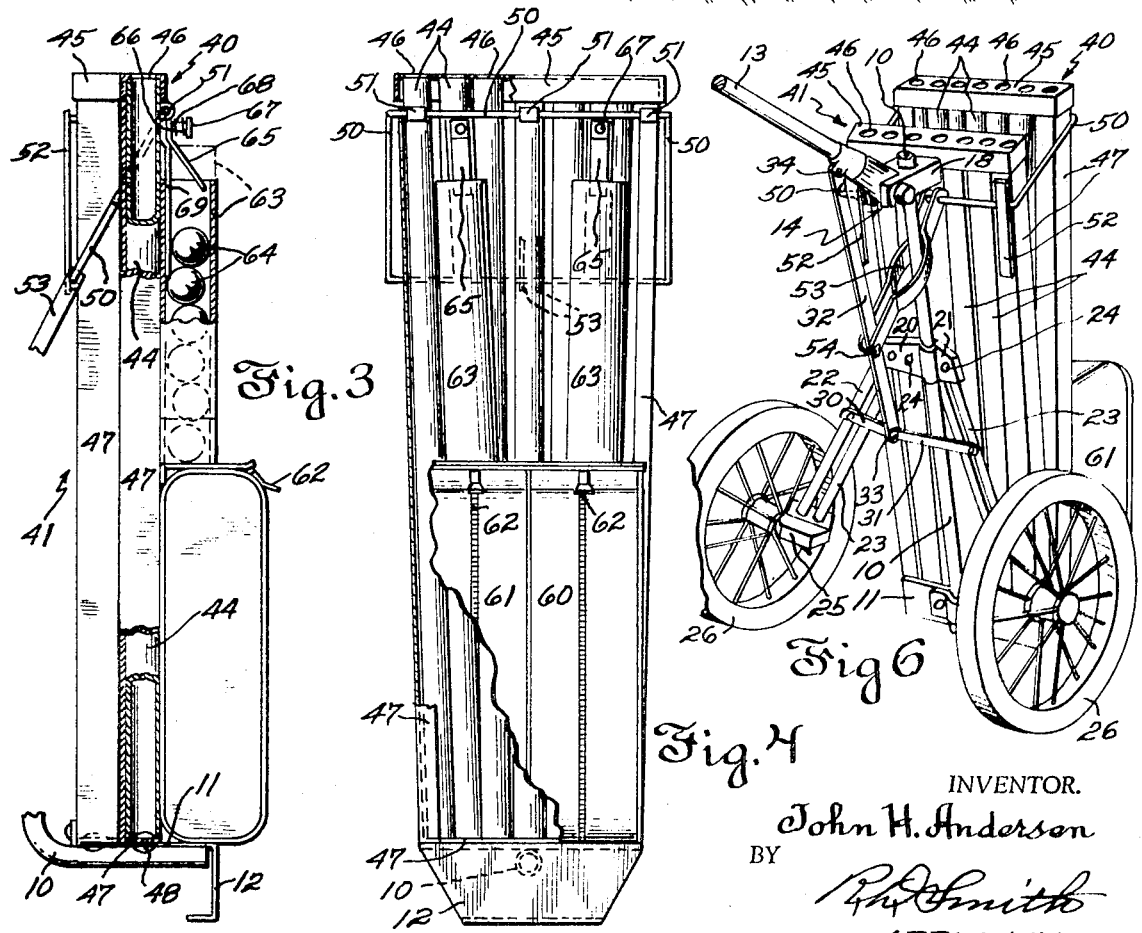
INVENTOR.
John H. Anderson
BY
R. D. Smith
ATTORNEY

GOLF CART WITH CLUB RACK FOLDABLE BY CART HANDLE

BRIEF SUMMARY OF THE INVENTION

It is known in the art of golf carts to provide a wheeled chassis with a dual folding rack in place of a conventional golf bag for holding and transporting golf clubs. It also has been proposed to equip such chassis with a swingable handle for hauling the cart. But heretofore the user of such a cart has been obliged to open and close the rack by direct manipulation of the rack sections as an act separate from and additional to positioning the handle for hauling and/or storing the cart.

An object of this invention is to increase the usefulness and convenience of a rack equipped cart by providing means through which swinging movement of the cart hauling handle will cause the rack to unfold from a closed condition to an open condition for facilitating the selection and removal of clubs from the cart. This eliminates the task of opening and closing the rack by separate and direct manipulation of the rack additional to manipulation of the cart hauling handle.

A further object pertains to racks whose ground wheels are shifted between spread and retracted positions by swinging the same cart handle that is operative to open and close the foldable rack of the cart.

The importance of these objects becomes evident when considering that a golf cart is stopped for use of the clubs on some 75 or more occasions during an 18-hole round of golf. Other objects of the invention will become clear from the following description of a successful embodiment of the improved cart having reference to the appended drawing wherein:

FIG. 1 is a side elevation of a collapsible golf cart equipped with a folding rack according to the present improvements and shown in closed condition for transportation or storage of the cart.

FIG. 2 is a similar view showing the foldable rack of the cart in opened condition to give free access to the clubs, the ground wheels being spread apart for hauling or standing the cart upright during each play in a round of golf.

FIG. 3 shows the club-carrying rack of FIG. 1 on an enlarged scale.

FIG. 4 is a front view of the rack looking from the right at FIG. 3.

FIG. 5 is a top plan view of the cart with its rack conditioned as in FIG. 1.

FIG. 6 is a view of the rear face of the cart showing in perspective the cooperative mechanisms which cause the cart wheels to be shifted between spread and retracted positions and the rack to be shifted between open and closed conditions.

The central "backbone" of the golf cart comprises a stiff columnar rod or tube 10 equipped at its lower end with a small forward extending platform 11 which is turned downward at its front edge to serve as a foot 12 enabling the cart to stand stably on the ground except when tilted during hauling by its swingable handle 13.

FIG. 5 shows a hinge joint 14 by means of which handle 13 is hingedly connected to columnar rod 10 so as to be swung from its collapsed position in FIG. 1 to a raised position for use shown in FIG. 2. Handle 13 is maintained yieldingly in either of these positions, or in a selected number of intermediate angular positions, by clutch teeth 15, 16 fixed respectively on the handle 13 and on the hinge bracket 18 that is fixed on column rod 10. Teeth 15, 16 are constantly urged together yieldingly in an axial direction by a spring washer 17, or other appropriate spring means.

Approximately midway the length of columnar rod 10 there is fixed thereto a pelvis-shaped pair of brackets or leg mounts 20 and 21. These mounts may be made of bent sheet metal and are disposed obliquely to the direction of travel of the cart. Each of mounts 20 and 21 receives and guides in hinged relation thereto a pair of parallel strut legs 22, 23. Hinge pins 24, each extending through one of the mounts 20 or 21, permit each leg to swing in the oblique plane of its mount while the legs of each pair retain parallelism.

Carried at the lower end of each pair of legs 22, 23 there is an axle 25 on which a ground wheel 26 is freely rotatable. Details of the structure at this point will be found in U.S. Pat. No. 2,957,707. Here it will suffice to say that the swinging of each pair of legs 22, 23 takes place simultaneously and causes ground wheels 26 to be shiftable back and forth between a spread position for use, as in FIG. 2, and a retracted position for transportation or storage as in FIG. 1.

The legs 22, 23 are manually caused to swing by means of a toggle linkage 30, 31 which connects the legs pivotally to an actuating member 32 at 33. Actuating member 32 slants upward from the toggle links 30, 31 to a pivotal connection at 34 with the swingable cart handle 13.

According to the present improvements swinging of the cart handle 13, about its pivotal connection 14 to the column rod 10, not only converts the cart wheels from a retracted condition for storage, shown in FIG. 1, to a condition for use shown in FIG. 2, but also and simultaneously causes the spreading of two relatively inclinable sections 40 and 41 of the rack of the cart. Each of sections 40 and 41 serves as a holder for the shafts of a row of inverted golf clubs which may comprise relatively long "woods" 42 and the shorter "irons" 43. For this purpose each rack section comprises an integral bank of united upright club holding sockets or tubes 44 preferably made of sufficiently stiff and rugged material to withstand the frequently repeated insertion and withdrawal of the clubs.

Each integral bank of the club holding tubes 44 is crowned at the top by an upwardly dished narrow cap 45 having smooth-edged apertures 46 that respectively register with the open tops of the tubes 44 and thus hold the tubes parallel and rigidly aligned in a straight row. Each bank of tubes is framed at the sides and across the bottom ends of the tubes by U-shaped channel irons 47 the bottom horizontal stretch of which rests on the aforesaid platform 11 that is rigid with the column rod 10 of the cart. Rack sections 40, 41 are secured to platform 11 somewhat loosely if desired, by fastening bolts 48 but in any case with enough freedom to be able to tilt for swinging between the closed and open relationship shown respectively in FIGS. 2 and 1. Since the spread need be only 5 inches or so at the tops of the sections there can be enough resilient distortion in the structure of the rack section itself to permit the tilting involved.

For control of such relationship no separate direct manipulation of the rack sections is needed because my newly devised mechanism operatively links the rack sections 40 and 41 to the swingable cart handle 13. In the herein disclosed embodiment of the invention such mechanism comprises a coupling link 50 which may take the form of a continuous rectangular loop of stiff wire having two straight horizontal stretches. One straight horizontal stretch of link 50 is pivotally mounted to rack section 40 by pivot affording hinge clips 51. The other stretch is freely slidable upward and downward guided by a bracket 52 secured to the back surface of rack section 41. The bracket guided stretch of bail 50 is operably connected to the actuating member 32 by a pitman 53 at 54, and thereby to the cart handle 13, wherefore lifting the cart handle to its position in FIG. 2 not only spreads the ground wheels 26 but also and at the same time spreads the rack sections so that at each play in a round of golf any desired club can be easily selected, removed from and restored to the rack.

The platform 11 supports in addition to the spreadable rack sections 40 and 41 dual garment bags 60 and 61, each openable by a zipper 62. In upright position on each garment bag there is a preferably transparent tubular container 63 of suitable capacity to hold a vertical tier of golf balls 64 which are accessibly retained in the tubular container by a narrow guard strip 65 that bridges the top opening of each container diametrically at a slant. The guard strip has an end at 66 that is hung on a stud 67 projecting from rack section 40 and yieldingly held in the position shown in the drawings by a spring coil 68 that surrounds the stud 67.

Each container 63 is retained against the front face of the rack section 40 by a vertical guide strip 69 that extends on the inside of the container for an upper portion of its length giving the tubular container freedom to be lifted endwise by hand while slidably nestled in the groove formed by adjacent tubular containers 63. When sufficiently so lifted, the bottom ball can drop out of the bottom end of the container and be removed for use in playing golf. When manually released the tubular container will drop down and again rest on the top of the garment bag whereby to retain the rest of the golf balls in the container.

What is claimed is:

1. In a cart for holding and transporting clublike articles, the combination with a wheeled chassis of, a foldable dual rack carried on said chassis comprising two slablike sections having broadside faces inclinable relatively to each other to open and close the rack, each of said sections comprising a bank of elongate upright sockets receptive to the respective shafts of different articles, a handle for hauling the cart hingedly connected to said chassis in a manner to be swung to chosen angles of inclination relative thereto, and mechanism including a coupling link operatively relating said handle to at least one of said rack sections guided to engage and slide with respect thereto in a manner to transmit swinging movement from the said handle to the said rack section.

2. In a cart as described in claim 1, wherein said coupling link is pivotally connected to at least one of the said rack sections.

3. In a cart as described in claim 1 wherein the said mechanism includes a motion transmitting member pivotally connected at one of its ends to the said handle and at its other end to the said coupling link.

4. In a cart as described in claim 1 wherein the said coupling link is loop shaped and substantially girds both of the said rack sections.

5. In a cart as described in claim 4, wherein the said coupling link comprises a substantially rectangular course of stiff rod movably flanking a broadside face and both edges of each of said slablike rack sections.

6. In a cart as described in claim 1 wherein together with at least two ground wheels laterally spreadable, separate axles on which said wheels are rotatable respectively, a rigid columnar post fixed to one of the said rack sections and with respect to which said axles are relatively shiftable to selected degrees of proximity, and additional motion transmitting means operatively connecting the said cart hauling handle to said axles.

7. In a cart as described in claim 6 wherein the said additional motion-transmitting means is connected additionally to the said cart hauling handle in a manner to cause simultaneous movement of the said rack sections and the said wheel axles.

8. In a cart as described in claim 1 wherein the broadsides of the said slablike rack sections extend transversely the direction of travel of the said wheeled chassis, together with at least one upright elongate container of game pieces such as golf balls paralleling and attached to the broadside of one of the said slablike rack sections.

9. In a cart as described in claim 8 wherein a container for a player's clothing attached to the broadside of the same slablike rack section as is the said ball container.

* * * * *

202-116

UNITED STATES PATENT OFFICE
CERTIFICATE OF CORRECTION

Patent No. 3,620,546                    Dated November 15, 1971

Inventor(s) John H. Andersen

It is certified that error appears in the above-identified patent and that said Letters Patent are hereby corrected as shown below:

In the abstract, Line 1, delete "closed by" and insert
    --storing and--

Signed and sealed this 23rd day of May 1972.

(SEAL)
Attest:

EDWARD M. FLETCHER, JR.            ROBERT GOTTSCHALK
Attesting Officer                  Commissioner of Patents